United States Patent [19]

Bachmann

[11] 4,299,414

[45] Nov. 10, 1981

[54] EXPANSION JOINT

[76] Inventor: Lothar Bachmann, Dillingham Hill Rd., Auburn, Me. 04210

[21] Appl. No.: 136,444

[22] Filed: Apr. 2, 1980

[51] Int. Cl.³ .............................................. F16L 55/00
[52] U.S. Cl. .................................. 285/187; 285/224; 285/229; 285/300
[58] Field of Search ............... 285/226, 224, 187, 299, 285/300, 301, 47, 53, 235, 236, 229

[56] References Cited

U.S. PATENT DOCUMENTS

| 2,656,201 | 10/1953 | Swerdlow et al. | 285/224 X |
| 3,460,856 | 8/1969 | Van Tine et al. | 285/53 |
| 3,721,460 | 3/1973 | Holman et al. | 285/224 X |
| 4,047,742 | 9/1977 | Haferkamp | 285/187 |
| 4,106,798 | 8/1978 | Houg | 285/226 |

FOREIGN PATENT DOCUMENTS

| 2239153 | 3/1974 | Fed. Rep. of Germany | 285/236 |
| 298237 | 7/1954 | Switzerland | 285/187 |

Primary Examiner—Dave W. Arola

[57] ABSTRACT

An expansion joint for ducts for high temperature gases has upstream and downstream members to be secured to spaced apart ends of corresponding duct sections. Each member has an outer flange, the outer flanges disposed towards each other and having a fabric cover secured thereto. The upstream member has an inner flange disposed towards the downstream member. A floating seal has right angular portions of which one overlaps the outer surface of the inner flange and the other overlaps the downstream member. Clips back each portion of the floating seal to hold them to provide a maximum clearance between the boundaries thereof. Resilient seals carried by the floating seal slidably engage the overlapped boundaries of the clearance.

10 Claims, 6 Drawing Figures

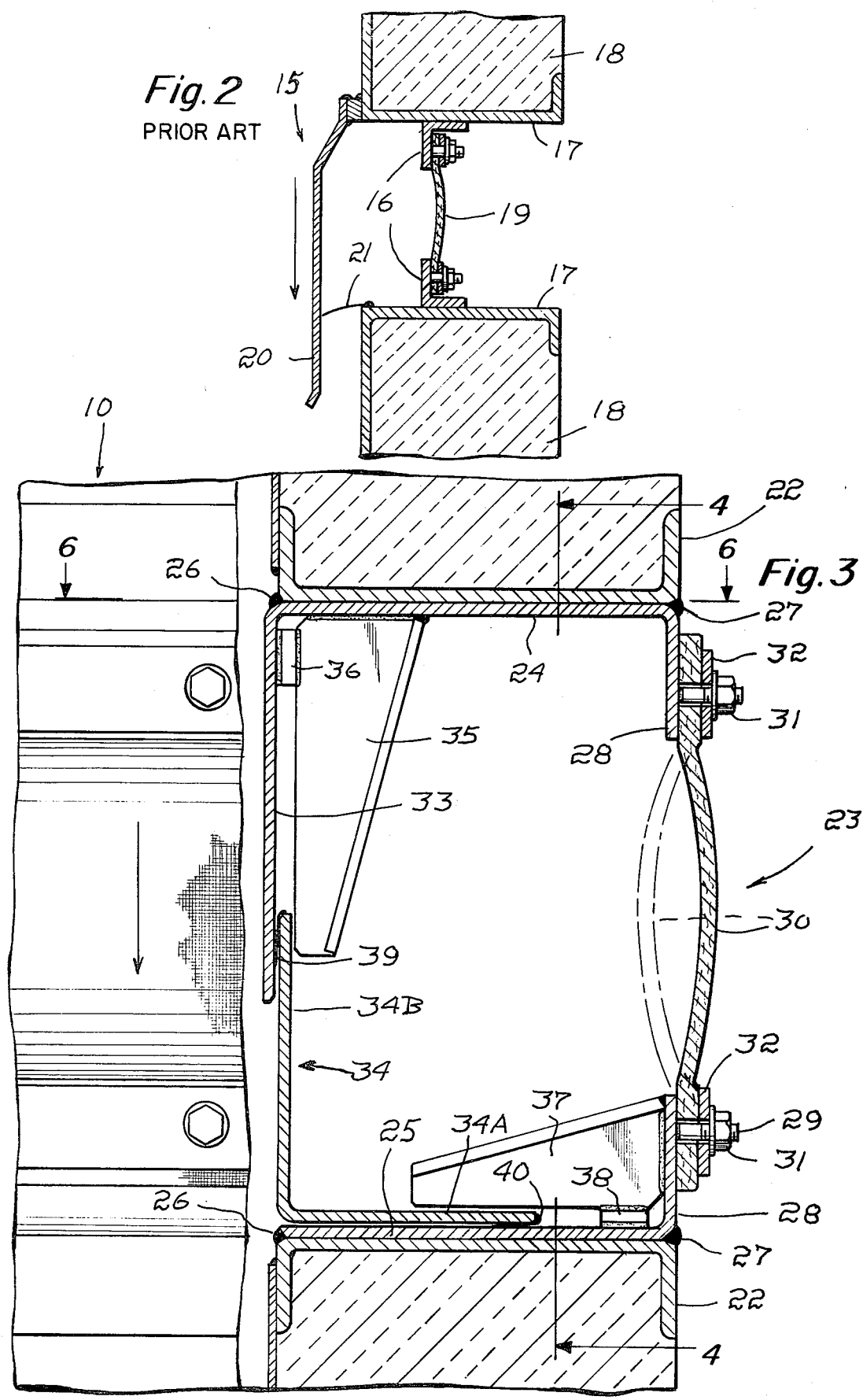

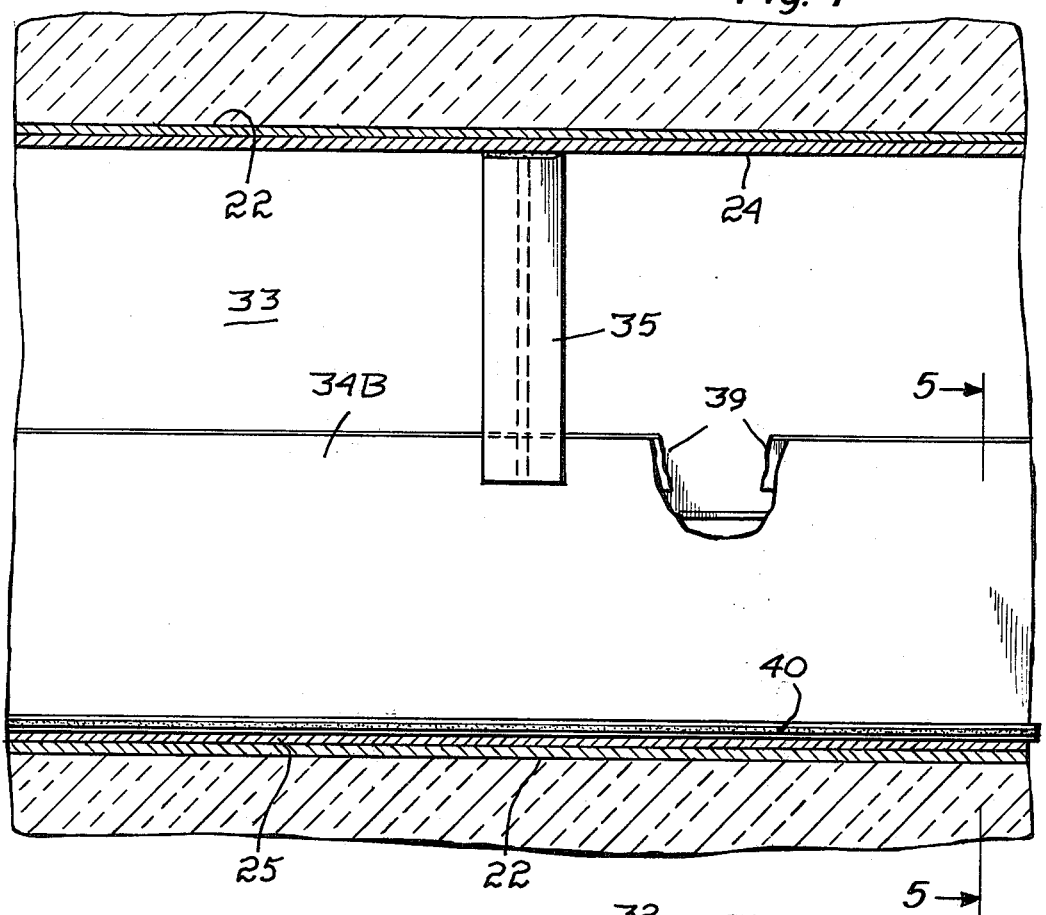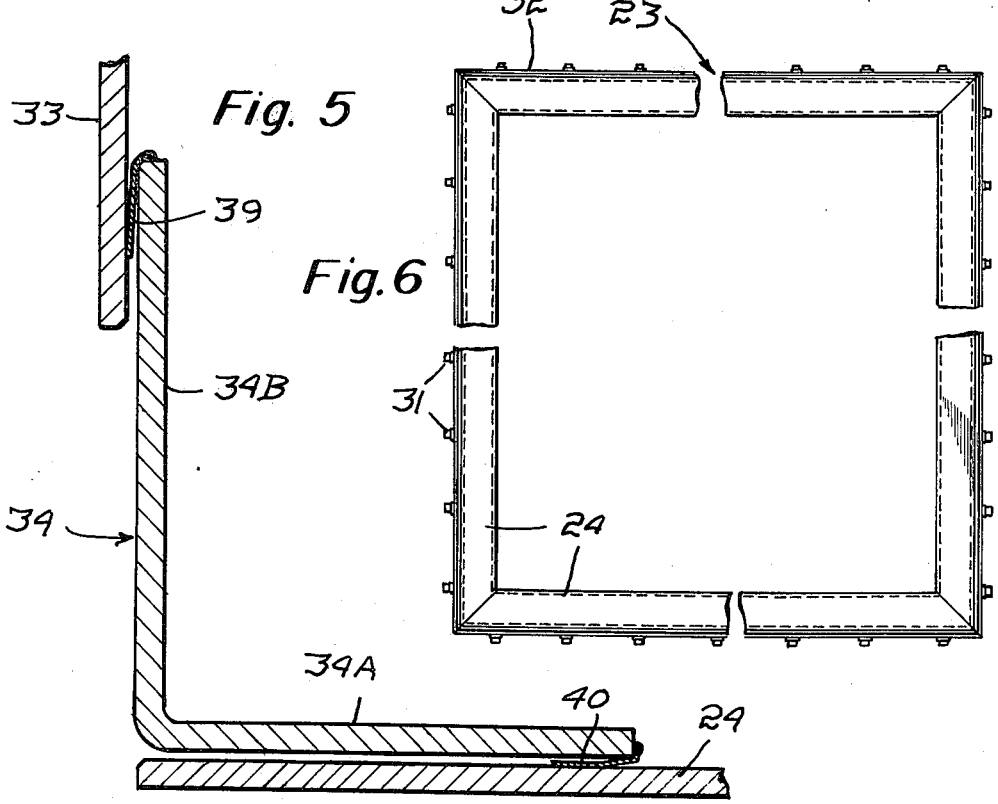

EXPANSION JOINT

BACKGROUND OF THE INVENTION

When ducts are designed to carry such gases as flue and exhaust gases and gases resulting from various processes, expansion joints are essential components in order to accommodate thermal stresses.

One widely used type of expansion joint has an outer fabric cover and an inner shield. Such expansion joints have not been satisfactory when substantial lateral movement or combined lateral and axial movements must be tolerated, in preventing direct exposure of the fabric to the hot gases and the entrapment of dusts in the joints.

The duct gases may and often do carry abrasive particles and they may be of a corrosive nature. Such ducts are typically large in cross section and a representative example is the duct work required for a power plant utilizing a boiler fired with pulverized coal.

Present requirements for the use of gas cleaning equipment at power plants has resulted in complex duct work making necessary the use of expansion joints on the upstream and downstream sides of each component.

A typical power plant provided with a boiler utilizing pulverized coal as fuel has between the economizer outlet and the stack a precipitator, an air preheater, fan, and gas scrubber, and gas reheater. The gas temperature that is initially high is below the dew point and highly corrosive downstream of the scrubber so that expansion joints must be capable of meeting various requirements to avoid failures due to excessive thermal stresses, abrasion and corrosion, temperature and a high incident of dust.

THE PRESENT INVENTION

The general objective of the present invention is to provide an expansion joint in which the fabric seal is effectively shielded when lateral and axial movements must be tolerated.

In accordance with the invention, this objective is attained with an expansion joint provided with upstream and downstream members each having an outer flange to which a fabric seal is sealed. The upstream member has an inner flange disposed towards the downstream member and a floating seal has first and second angularly disposed portions with the first partially overlapping the outer surface of the inner flange and defining therewith the boundaries of a first clearance. The second portion of the floating seal partially overlaps the second member and defines therewith the boundaries of a second clearance. Resilient lip seals are provided for each clearance and are sealed to one boundary thereof for resilient sliding engagement with the order boundary of that clearance. Retainers attached to the member back both portions of the floating seal to maintain the clearances.

Other objectives of the invention and its novel features and advantages will be apparent from the following description of the preferred embodiment and the appended claims.

BRIEF DESCRIPTION OF THE DRAWINGS

The accompanying drawings illustrate a preferred embodiment of the invention with FIG. 1 a schematic view of a layout for a power plant having a pulverized coal fired boiler;

FIG. 2 is a fragmentary section of a typical prior art expansion joint;

FIG. 3 is a partly section, fragmentary side elevation of an expansion joint in accordance with the invention;

FIG. 4 is a fragmentary section on a substantial increase in scale taken approximately along the indicated line 4—4 of FIG. 3;

FIG. 5 is a section, on a further increase in scale, taken approximately along the indicated line 5—5 of FIG. 4; and FIG. 6 is a plan view, on a substantially reduced scale, of the expansion joint if viewed substantially along the indicated line 6—6 of FIG. 3.

THE PREFERRED EMBODIMENT OF THE INVENTION

Figure 1:
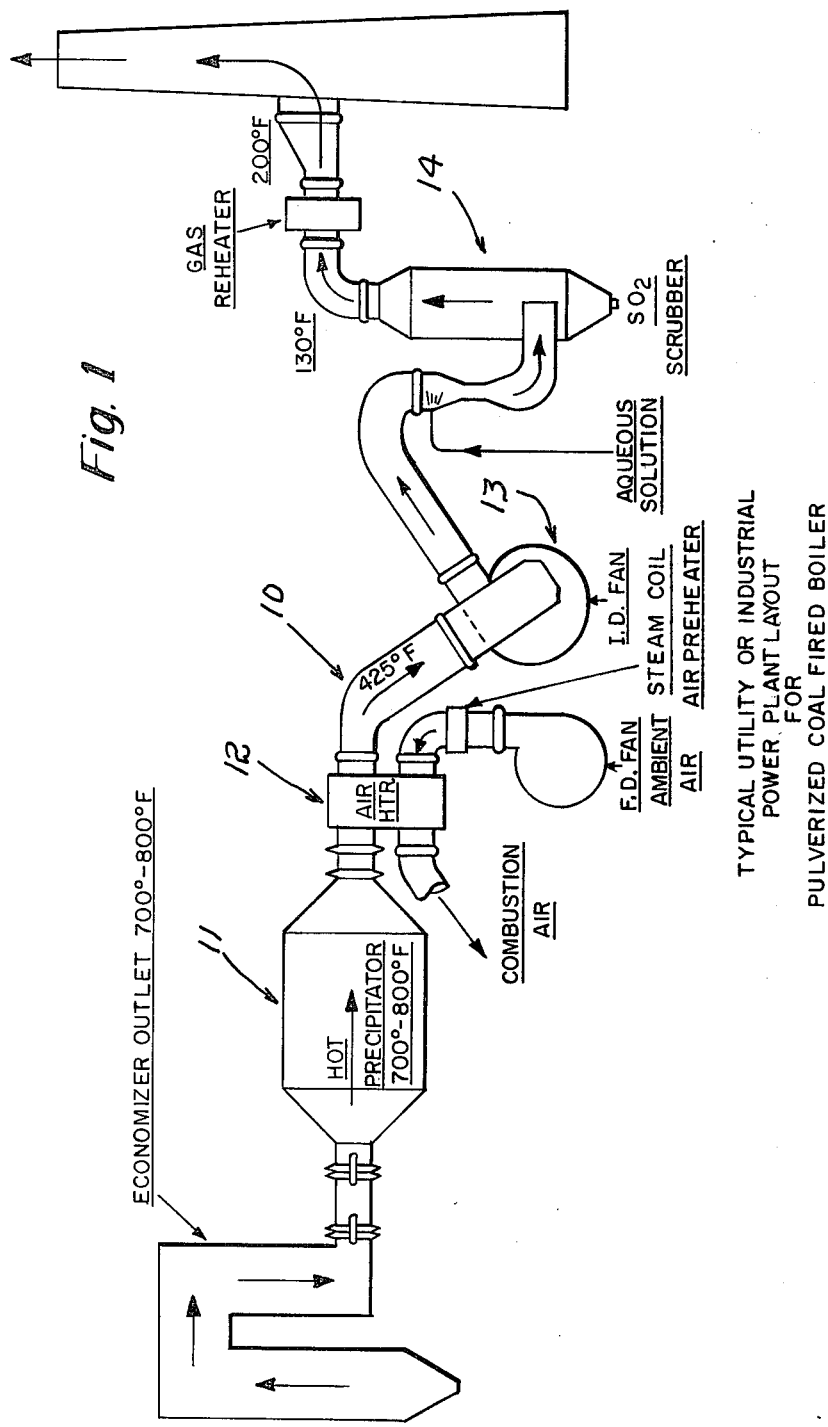

FIG. 1 schematically illustrates a typical layout of a duct system between the boiler and the stack of a power plant where the boiler is fired with pulverized coal. Such a system has a duct 10 provided with a series of gas processing units such as a precipitator 11, a heater 12 for the combustion air supply, a fan 13, and a gas scrubber 14 with the temperature decreasing as the gas flows towards the stack but with expansion joints usually required on both sides of each such unit. The expansion joints, in some cases, must accommodate lateral movements, in other, axial movements are encountered. Commonly, both types of movements must be tolerated.

The duct 10 is of a conventional construction and the usual practice is to provide, wherever an expansion joint is to be incorporated, the proximate ends of the duct sections with metal end frames for use in securing the expansion joint.

A typical prior art fabric expansion joint is generally indicated at 15 in FIG. 2 and is shown as having holders 16 of right angular section secured to the metal end frames 17 of the duct sections 18 with the direction of gas flow indicated by the arrow. A fabric seal 19 is marginally clamped to the holders 16 and is so dimensioned and so attached that it bulges slightly outwardly thus to enable it to flex for either or both expansion movements and to bulge inwardly if negative pressures prevail in the duct.

Fabric seals are constructed of several layers of different materials depending on the temperature, pressure, vibration, and the nature of the gases to which the seal is to be exposed. A typical seal, by way of example, has asbestos and Teflon layers with stainless steel mesh as a reinforcement.

The joint 15 has a metal shield 20 to protect the fabric seal 19 with the shield 20 overlapping but spaced a substantial distance inwardly of the interior of the downstream duct section thus to avoid contact therewith during lateral movements of the joints. In recognition of the fact that the shield 20 could not usually provide protection against direct contact of the hot gas with the fabric seal 19 and particularly the entry of particulate matter into the joint, a flexible resilient seal 21 was sometimes secured to the end frame 17 of the downstream duct section to engage resiliently the outer surface of the shield 20. While this arrangement was partially effective, any lateral movement reduced the effectiveness of the seal 21.

In accordance with the present invention, the metal end frames 22 of the sections of the duct 10 are of channel stock. The expansion joint, generally indicated at 23, includes first and second frame members 24 and 25, respectively, of the size and shape of the end frames 22 and each secured to the appropriate one of the end frames by a continuous weld 26 between their inner edges and also by welding together their outer edges as by spot welds 27. Each member 24, 25 has an outer flange 28 with the flanges 28 disposed towards each other and in the same plane and each is provided with a series of studs 29 to enable the continuous fabric seal 30 to be secured thereto by nuts 31 seated against anchoring strips 32. The member 24 has an inner flange 33 of substantial axial extent disposed towards but terminating short of the inner edges of the frame member 25 and substantially flush with the interior surfaces of the duct 10.

A third frame member, a floating seal generally indicated at 34, has right angular portions 34A and 34B with the portion 34A seated on the member 25 and the portion 34B of such axial extent that it freely overlaps a substantial part of the inner surface of the inner flange 33 of the frame member 24. The floating seal 34 is slidably held to permit axial movement by clips 35 welded to the frame member 24 and to spacers 36 welded to the inner surfaces of its flange 33. The floating seal 34 is slidably held against the second member 25 by clips 37 welded to the flange 28 thereof and to spacers 38. In practice, the clips 35 are spaced four feet apart while the clips 37 are spaced two feet apart and out of alignment with the clips 35.

Lip seals 39 and 40 of resilient metal stock are welded to and extend along the edges of the floating seal 34 with substantial portions disposed towards the interior of the duct 10 and in resilient engagement, respectively, with the inner face of the flange 33 and the frame member 25, and shaped and dimensioned to maintain resiliently such sealing engagement during any and all relative movements between the frame members 24 and 25.

In accordance with the invention, not only is the fabric seal 30 protected against direct contact by hot gases and particulate matter carried thereby but also, because the flanges 28 are substantially flush with the exterior of the duct 10, temperature to which the interior portions of the members 24 and 25 are exposed become moderated to a substantial extent before being transmitted to the margins of the fabric seal 30 thereby prolonging its life.

I claim:

1. An expansion joint to couple the ends of sections of a duct for such hot gases as flue, exhaust and process gases, said joint including an upstream member and a downstream member, each for attachment to the end wall of the corresponding duct section, each member including an outer flange disposed at right angles thereto and towards the other member, the flanges substantially in alignment when thus attached, said upstream member also including an inner flange disposed at right angles thereto and toward the inner end of the downstream member and defining a portion of the flue, a floating seal including first and second right angular portions, the first partially overlapping the surface of the inner flange of the upstream member which faces said outer flange and defining with said surface the boundaries of a first clearance and the second portion partially overlapping the downstream member and defining therewith the boundaries of a second clearance, resilient lip seals, one for each clearance and secured to one boundary thereof and in resilient sliding engagement with the other boundary of that clearance, retaining means attached to said members and in engagement with the surface of both portions of the floating seal opposite their boundary defining surfaces to maintain said clearances, and a fabric seal secured to said outer flanges and dimensioned lengthwise of the joint to enable it to flex in response to any relative movement between said members in response to expansion forces.

2. The expansion joint of claim 1 in which each clearance is approximately 1.375 inch in width.

3. The expansion joint of claim 1 in which the lip seals are secured to the floating seal.

4. The expansion joint of claim 3 in which the lip seals are welded to the end edges of the floating seal.

5. The expansion joint of claim 1 in which each lip seal is disposed with its free end directed toward the open end of the clearance in which it is located.

6. The expansion joint of claim 1 in which the retaining means consists of laterally spaced series of clips, one series for each portion of the floating seal and secured to the appropriate one of said members.

7. The expansion joint of claim 6 in which there are twice as many clips in the series secured to the downstream member as there are in the series secured to the upstream member, the clips of each series laterally offset relative to the clips of the other series.

8. A duct for such hot gases as flue, exhaust, and process gases, said duct including two sections the proximate ends of which are spaced apart, and an expansion joint including upstream and downstream members, each secured to the end of the corresponding duct section, each member including an outer flange disposed at right angles thereto and towards the other member and substantially in alignment, said upstream member also including an inner flange disposed at right angles thereto and toward the inner end of the downstream member and defining a potion of the flu, a floating seal including first and second right angular portions, the first portion partially overlapping the surface of the inner flange of the upstream member facing the outer flange thereof and defining with said surface the boundaries of a first clearance and the second portion partially overlapping the downstream member and defining therewith the boundaries of a second clearance, resilient lip seals, one for each clearance and secured to one boundary thereof and in resilient sliding engagement with the other boundary of that clearance, retaining means attached to said members and in engagement with the surfaces of both portions of the floating seals opposite their boundary defining surfaces to maintain said clearances, and a fabric seal secured to said outer flanges and dimensioned lengthwise of the joint to enable it to flex in response to any relative movement between said members in response to expansion forces.

9. The expansion joint of claim 8 in which each outer flange is substantially flush with the outer surface of the conduit section to which it is attached.

10. The expansion joint of claim 8 in which the inner flange of the upstream member is substantially flush with the inner surface of the conduit section to which it is attached.

* * * * *